United States Patent
Seidel

[15] 3,637,292
[45] Jan. 25, 1972

[54] ACOUSTO-OPTICAL DISPLAY DEVICE

[72] Inventor: Harold Seidel, Warren Township, Somerset County, N.J.

[73] Assignee: Bell Telephone Laboratories, Incorporated, Berkeley Heights, N.J.

[22] Filed: July 25, 1969

[21] Appl. No.: 844,960

[52] U.S. Cl. .................................350/161, 40/52
[51] Int. Cl. ..............................G02f 1/28, G09f 11/00
[58] Field of Search..................40/52; 350/161; 178/7.6

[56] References Cited

UNITED STATES PATENTS

| | | | |
|---|---|---|---|
| 3,397,936 | 8/1968 | Frayne et al. | 178/7.6 |
| 3,499,705 | 3/1970 | Baynham et al. | 350/161 |

OTHER PUBLICATIONS

" Laser Experiments Involving In–Cavity Modulation with Electro–Optic Crystals." Rugari et al.; Proc. of the IEEE; July 1964 p. 852.

*Primary Examiner*—Ronald L. Wibert
*Assistant Examiner*—V. P. McGraw
*Attorney*—R. J. Guenther and Arthur J. Torsiglieri

[57] ABSTRACT

A display is formed by directing an optical beam onto an acousto-optical medium having a single small region of substantial strain which is caused to traverse the medium controllably.

9 Claims, 11 Drawing Figures

ACOUSTO-OPTICAL DISPLAY DEVICE

The present invention relates to direct optical displays, and in particular, to displays utilizing an interaction between acoustic and optical wave energy.

BACKGROUND OF THE INVENTION

Prior art display innovators have encountered significant difficulties in the realization of suitable optical display devices. The need in such systems for highly sophisticated beam deflectors, small spot sizes and complex optical components, to mention a few, has presented many technical and economical problems. The search for solutions to these problems has stimulated much thought on alternative techniques for optical displays.

It is, therefore, a broad object of the present invention to provide an optical display device which offers significant advantages over the prior art by utilizing the interaction of acoustic and optical wave energy.

SUMMARY OF THE INVENTION

In accordance with the present invention, a homogeneous acousto-optical medium is made to exhibit a large degree of strain over a limited region of its area or volume. As a result, the medium effects the passage of light in two ways. The strained region of the medium, being a region of discontinuity, scatters the light in all directions. The unstrained region, on the other hand, being substantially homogeneous, refracts and reflects the light only in directions consistent with the laws of refraction and reflection. Light radiating from a surface opposite to the surface of incidence, therefore, consists of both scattered light, propagating in all directions, and refracted light, propagating in a single direction. By suitably positioning a viewer observing such a surface, only the scattered light is perceived. That is, the scattering region acts as a point source of light. By applying strain to successive regions in the medium, a moving point of light is observed.

It is a first advantage of the present invention that display resolution is substantially independent of the illuminating beam width, and, hence, the need for a small, highly collimated optical beam is substantially reduced.

A second advantage of the present invention is that neither rapid movement nor large angle deflection of the optical beam is usually required, and, therefore, the employment of an involved beam deflection mechanism is usually unnecessary.

A third advantage of the present invention is that fewer optical components are employed, thereby reducing optical complexity and cost.

These and other advantages of the present invention may be better understood by reference to the following detailed description and drawings, in which specific embodiments of the present invention are discussed.

Figure 4:
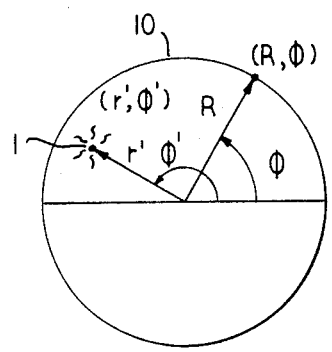
Figure 5:
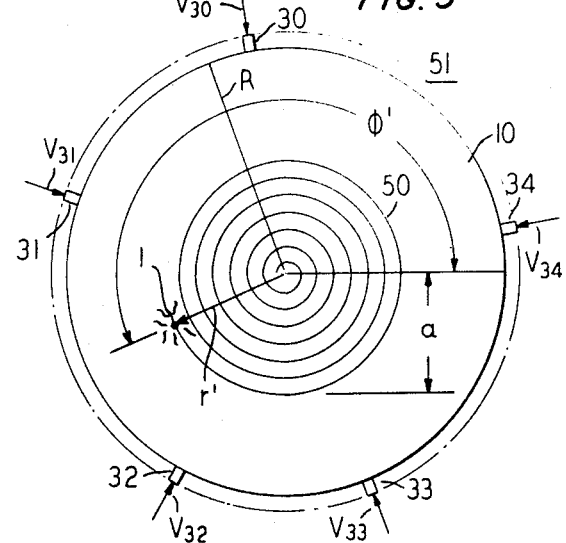
Figure 6:
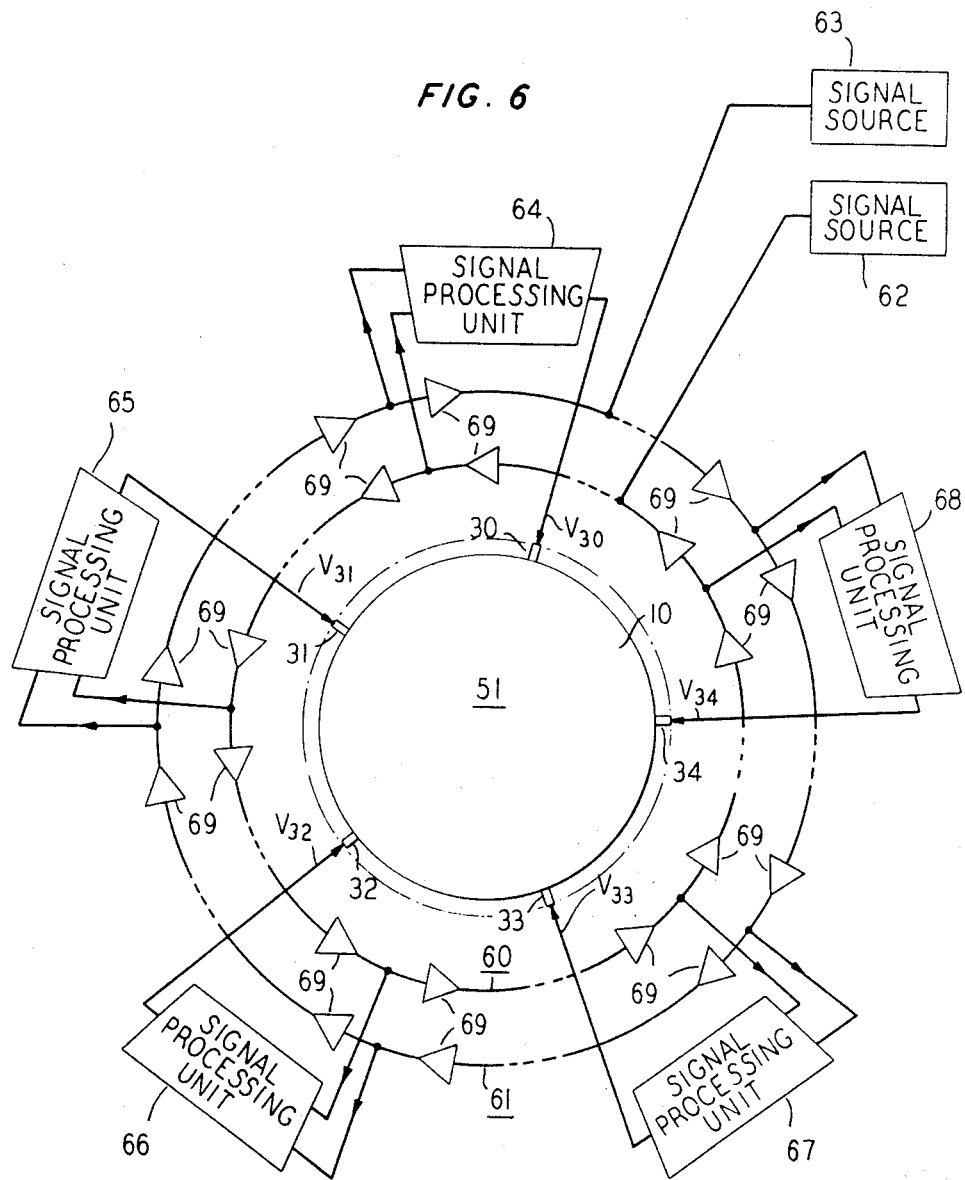
Figure 7:
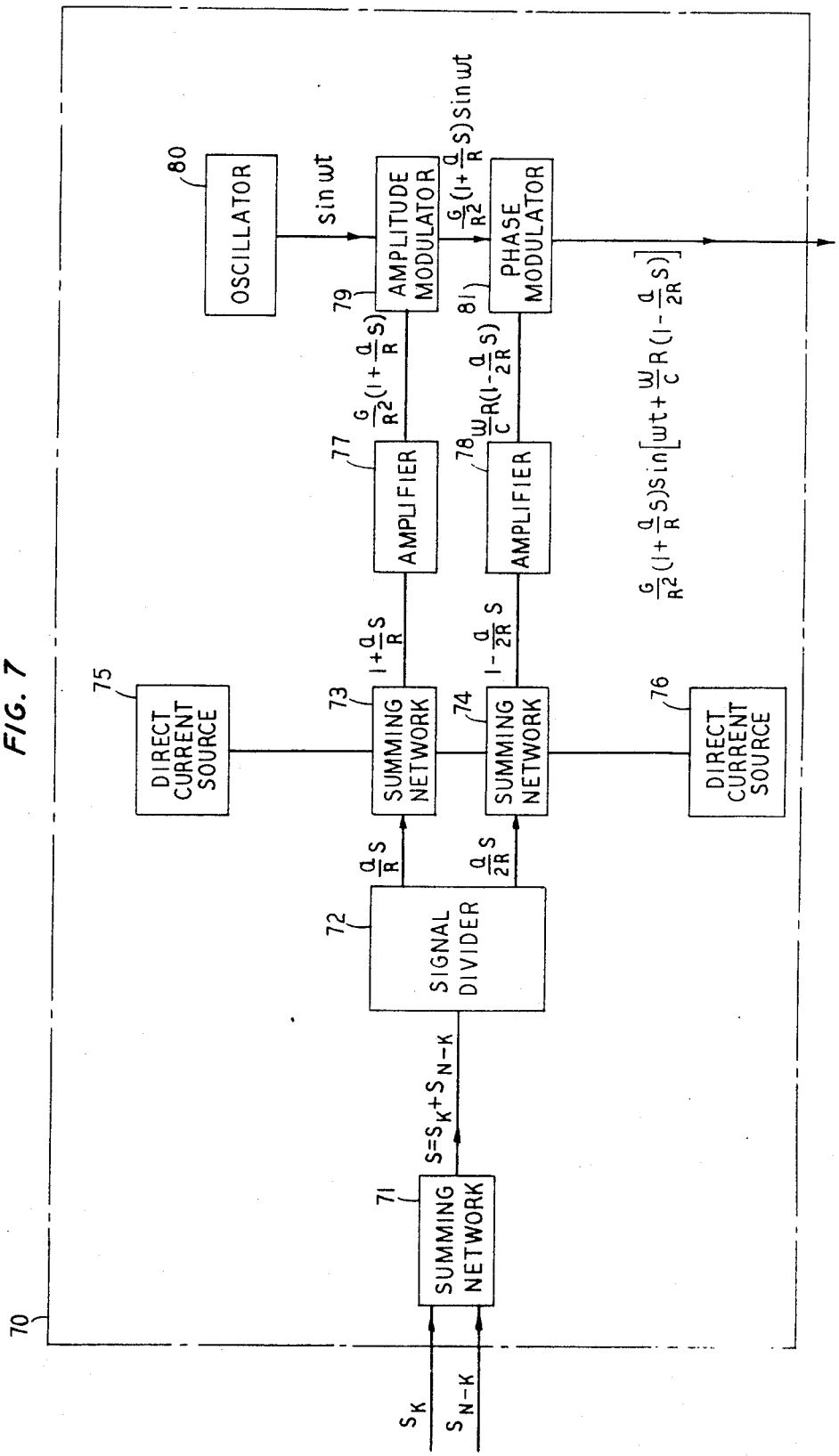
Figure 8:
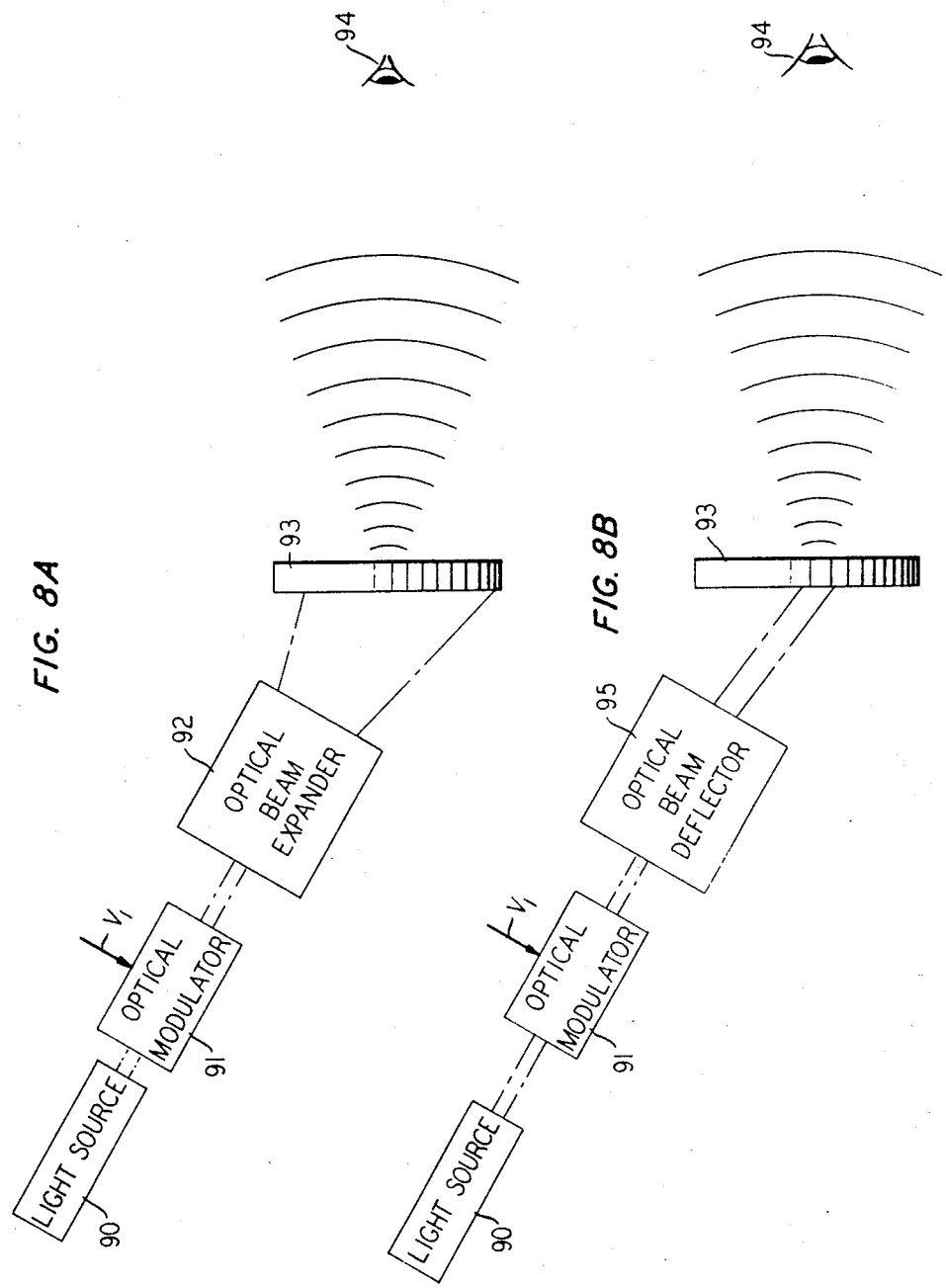
Figure 9:
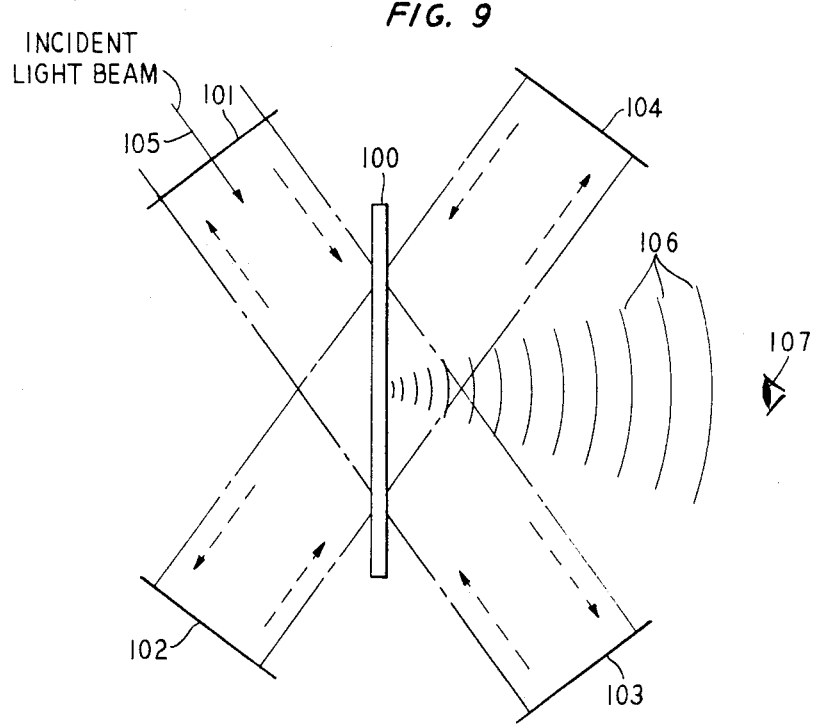
Figure 10:
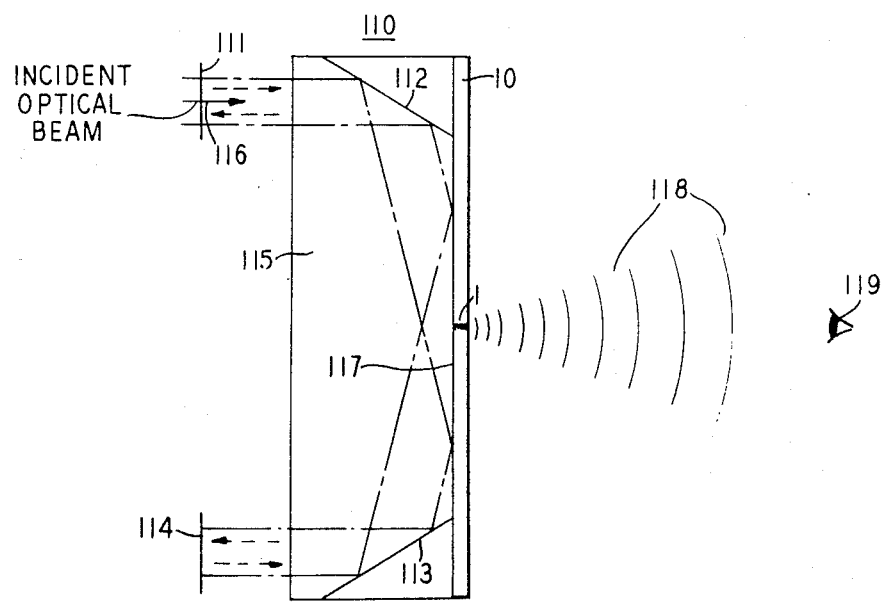

FIG. 4, included for purposes of explanation, shows an acousto-optical medium excited by a small region of acoustic strain;

FIG. 5 illustrates a spiral raster generated by a small strained region in an acousto-optical medium;

FIG. 6 illustrates an electrical configuration to generate the spiral raster in FIG. 5;

FIG. 7 is a block diagram of the signal processing unit employed in the electrical configuration of FIG. 6;

FIGS. 8A and 8B are illustrative of visual display systems using an acousto-optical medium to form the display;

FIG. 9 shows an arrangement for enhancing the light output of an acousto-optical display; and FIG. 10 illustrates a second arrangement for enhancement of the light output of an acousto-optical display.

DETAILED DESCRIPTION

Figure 1:
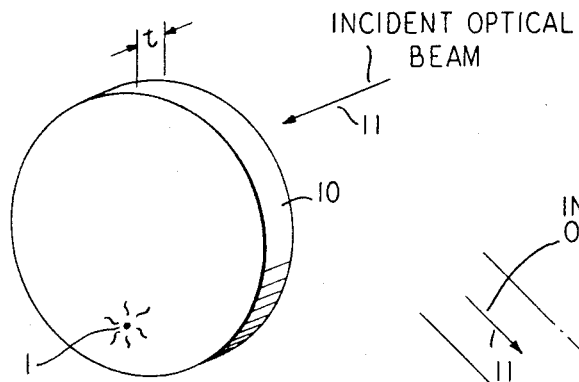
FIG. 1 illustrates an acousto-optical medium having a small region of substantial strain.

Medium 10 of FIG. 1 is an acousto-optical medium having the dual capability of supporting acoustic waves and transmitting optical waves. The medium may be either a bulk material, such as lithium niobate, or a fluid such as water. As illustrated, it is circular in shape but other shapes can be employed. The thickness $t$ of the medium is dependent upon the nature of the acoustic waves to be generated therein. In accordance with the present invention, either surface acoustic waves or bulk acoustic waves can be utilized. If surface waves are used, the medium can be fairly thick, since operation of the invention will be substantially independent of thickness. However, if bulk waves are used, operation will be thickness dependent, and a thin medium is advantageously employed to obtain the best results. In either case, the generation of a region of high acoustic wave intensity produces an interaction between the acoustic wave and an incident optical wave, as will be explained in greater detail hereinbelow.

Most prior art devices making use of an acousto-optical interaction have been concerned with modulating or deflecting a collimated beam of light by means of a periodic acoustic wave propagating in the medium. In all of these applications it is essential that the beam, upon passing through the medium, remain essentially collimated while experiencing the desired alterations in intensity or direction of propagation.

In the present invention, the effect produced is analogous to producing a pulse of acoustic disturbance, rather than the usual standing or travelling wave sinusoidal disturbances. Thus, the medium of FIG. 1 is found to be substantially free of any significant acoustic disturbance except for a small region 1 of high compression or strain.

With the medium acoustically excited in this manner, an incident beam of light 11 experiences little deflection or modulation on passing through it. The major portion of the incident optical beam is refracted and reflected by the medium in accordance with the well-known laws of refraction and reflection. The small region of high strain, however, has a more useful effect on the incident optical beam. It scatters that portion of the beam incident thereon in all directions. The effect is to make this portion of the incident beam directly visible by observation of the scattered rays. The acousto-optical structure of FIG. 1, therefore, being capable of producing an apparent point source of light is quite suitable for use as a display device. Furthermore, by moving the point source and simultaneously modulating the incident light, a composite image is produced.

It is well to note that the aforementioned prior art acousto-optical devices do not possess this direct display capability. Since light propagates from such devices in a substantially unique direction, it is capable of being seen only by observation along that direction. Hence, devices of this nature have a very limited field of view and, as a result, are unsuitable for direct display purposes.

The use of the acousto-optical medium of FIG. 1 as a display is based upon the fact that the apparent point source of light produced is sufficiently small to provide acceptable visual resolution. Since the apparent point source, in this case, is the strained region, it is evident that the resolution of the display is controlled by the area of this region. In most prior art displays, on the other hand, it is the incident beam width that is the controlling factor in determining resolution. As such, these prior art systems must employ incident beams with very narrow widths. The present invention, by making image resolution substantially independent of the width of the incident light beam, has the advantage of avoiding the problems that arise in realizing narrow beam widths.

Figure 2:
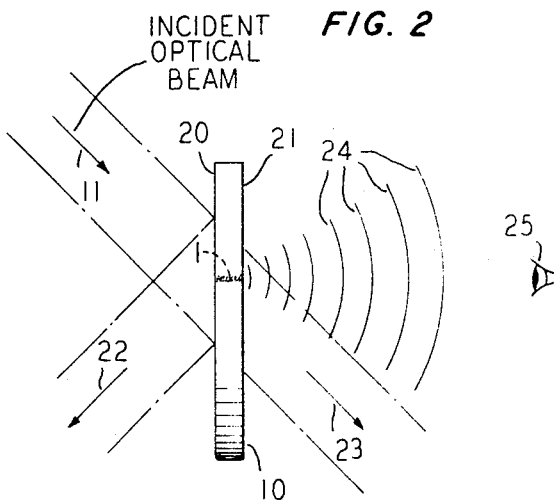
FIG. 2 illustrates the effect of applying an optical beam to the medium in FIG. 1.

FIG. 2 shows a side view of the acousto-optical medium of FIG. 1, with a light beam 11 incident upon one of its surfaces. As indicated above, except for a small region 1, medium 10 is free of any substantial acoustic strain. Thus, the major portion of light beam 11, incident on surface 20, is refracted and reflected by the medium and radiates from surfaces 20 and 21 as unidirectional beams 22 and 23, respectively. The portion of beam 11 incident on region 1, however, is scattered by the high acoustic strain present and radiates from surface 21 in all directions, as is illustrated by the spherical wave fronts 24. This portion of the incident beam propagates away from surface 21 as from a point source, and is observable to a viewer 25. Directional beam 23, however, is not observable since viewer 25 is not situated along its direction of propagation.

Beam 11, in FIG. 2, has been depicted as having a substantially larger width than region 1. As previously stated, it is the dimensions of the strained region that determine resolution and not the width of the incident beam. Hence, in accordance with the invention, beam 11 can be made relatively wide without affecting display performance. More specifically, it is most desirable to have beam 11 wide enough to encompass the entire viewing area of the acousto-optical medium, since this eliminates the necessity of moving the optical beam. In some applications, however, a beam width of size adequate to cover this area may not be capable of providing sufficient light flux to enable the image to be seen with the desired intensity. In such cases, the beam width can be made small enough to provide a perceptible image, and a light deflector can be used to provide movement of the beam to cover the desired area. In any case, the beam width will always be substantially larger than the strained region so that the requirements on the beam deflection device will be well within the achievable limits of present-day devices.

Figure 3:
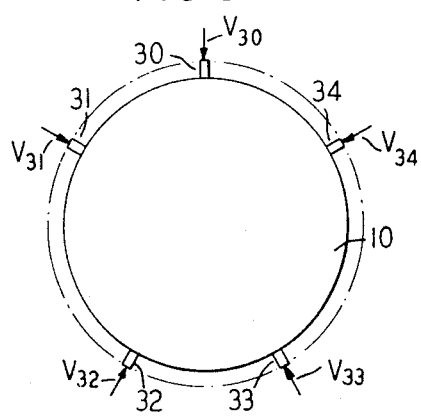
FIG. 3 is illustrative of one arrangement for producing a substantial strain over a small region of the acousto-optical medium shown in FIG. 1.

In order for the acousto-optical medium to exhibit the required strain, a large amount of acoustic energy is vested into a relatively small region of the medium. This can be accomplished in a variety of ways. One such arrangement is illustrated in FIG. 3. In this embodiment, the acousto-optical medium 10 is bounded about its periphery by a plurality of N electroacoustic transducers of which 5 transducers 30, 31, 32, 33, and 34 are shown, equally spaced at angular intervals of $2\pi/N$ radians. The transducers couple acoustic energy into the medium in accordance with their individual electrical excitations, $v_k$.

In general, the acoustic waves induced thereby interact both constructively, producing regions of high strain, and destructively, producing regions of low strain. In accordance with the present invention, the transducers are energized in a manner to produce only one region of constructive interference and, hence, only one region of high strain.

In order for the generated waves to so interact, the phase and amplitude of the acoustic excitation provided by each transducer must be properly selected. The solution to this problem is conveniently realized by applying the principle of time-reversal. Since the acousto-optical medium with its attached transducers represents a reversible system, an effect which produces a result can itself be produced by using the result as the effect. In accordance with the time reversal technique, the strain is now the effect, and the acoustic excitation at each transducer becomes the result.

Thus, the problem, as illustrated in FIG. 4, reduces to determining the amplitude and phase of the disturbance at any point $(R, \phi)$ on the periphery of acousto-optical medium 10 due to a strained region 1 at a point $(r'\phi')$ within the medium. These expressions are approximated by the following equations:

$$A(\varphi) = \frac{1}{R^2}\left(1 + \frac{2r'}{R}\cos(\varphi - \varphi')\right) \quad (1)$$

$$\beta(\varphi) = \frac{-\omega}{c}R\left(1 - \frac{r'}{R}\cos(\varphi - \varphi)\right) \quad (2)$$

where the amplitude equation (1) and the phase equation (2) are subject to the condition that $R^2 >> r'^2$ and the parameters $\omega$ and $c$ are defined, respectively, as the acoustic frequency and the speed of the acoustic waves in the medium.

Having formulated equations (1) and (2), we perform a phase reversal which results in the required expressions. These expressions are:

$$A(\varphi) = \frac{1}{R^2}\left(1 + \frac{2r'}{R}\cos(\varphi - \varphi')\right) \quad (3)$$

$$\beta(\varphi) = +\frac{\omega}{c}R\left(1 - \frac{r'}{R}\cos(\varphi - \varphi')\right) \quad (4)$$

Equations (3) and (4) represent the relative phase and amplitude of the acoustic signals which an infinite number of transducers distributed about the periphery of the acousto-optical medium must couple into the medium in order to produce a region of high strain about an arbitrary point $(r'\phi')$ within the medium. Practical considerations, however, generally dictate the use of a finite number of transducers. The effect of this limitation is to produce not only a region of high strain but, in addition, small amounts of strain throughout the remainder of the medium. To a viewer, this additional strain has the character of visual noise and results in the production of perceptible background light. The contrast between this background light and the light scattered by the strained region will generally determine whether the background light is objectionable. Hence, for any particular application the number of transducers employed will depend upon the required contrast between the background light and the light forming the image.

As do most display devices, the present acousto-optical display forms visual images by a scanning process which forms a raster. In the instant case, scanning is produced by movement of the strained region in a continuous, defined manner. While, in general, any arbitrary raster can be traced, one particularly convenient raster, illustrated in FIG. 5, is a spiral 50.

The parameters $r'$ and $\phi'$, in FIG. 5, represent a vector tracing the spiral movement of region 1 within an acousto-optical structure 51 similar to the structure illustrated in FIG. 3. In order that the region move in the fashion illustrated, $r'$ and $\phi'$ are made to obey the following equations:

$$r' = a \sin \Omega t \quad (5)$$
$$\phi' = \omega' t \quad (6)$$

where the parameters $\Omega$ and $\omega'$ in equations (5) and (6), respectively, are chosen such that $\omega' >> \Omega$.

To obtain the expressions for the excitation provided by the boundary transducers, equations (5) and (6) are substituted for the parameters $r'$ and $\phi'$, in equations (3) and (4). Performing the substitution, the resultant expressions are:

$$A(\varphi) = \frac{1}{R^2}\left(1 + \frac{2}{R}a \sin \Omega t \cos(\varphi - \omega' t)\right)$$

$$\beta(\varphi) = \frac{\omega}{c}R\left(1 - \frac{a}{R}\sin \Omega t \cos(\varphi - \omega' t)\right)$$

Expanding the above gives, $$A(\varphi) = \frac{1}{R^2}\left\{1 + \frac{a}{R}\{\sin[(\Omega - \omega')t + \varphi] + \sin[(\Omega + \omega')t - \varphi]\}\right\} \quad (7)$$

$$\beta(\varphi) = \frac{\omega}{c}R\left\{1 - \frac{a}{2R}\{\sin[(\Omega - \omega')t + \varphi] + \sin[(\Omega + \omega')t - \varphi]\}\right\} \quad (8)$$

Thus, equations (7) and (8) define the relative amplitudes and phases of the acoustic wave excitation required of the transducers to generate a spiral raster in medium 10.

In order for the boundary transducers to provide the acoustic excitations defined by equations (7) and (8), they must be provided with appropriate electrical excitation. FIG. 6 illustrates an arrangement for generating the required electrical signals.

In FIG. 6, acousto-optical structure 51 is encircled by two rings 60 and 61 of serially connected amplifiers. Inner ring 60 is shown with energy propagating in a counterclockwise direction, while outer ring 61 is shown with energy propagating in a clockwise direction. Excitation for these rings is provided by signal sources 62 and 63, respectively. Also connected to the amplifier rings are a plurality of N identical signal processing units, one for each transducer, of which five units 64, 65, 66, 67, 68 are shown. Each unit is electrically excited by two signals, one from each ring, and serves as the source of excitation for one of the transducers.

In operation, the amplifiers of rings 60 and 61 are energized by signal sources 62 and 63 at frequencies $\Omega-\omega$ and $\Omega+\omega$, respectively. Each amplifier 69 provides unity gain and a phase shift equal to $2\pi/N$ radians. As such, the signal at any point along each ring is equal in amplitude to the applied signal, but is displaced in phase an amount equal to $2\pi/N$ $(m)$ where $m$ is equal to the number of amplifiers the applied signal has passed through in reaching said point.

The signals extracted from the $k^{th}$ amplifier in ring 60 and the $(N-k)^{th}$ amplifier in ring 61 are used to excite the $k^{th}$ processing unit serving the $k^{th}$ transducer, where $k$ is any integer between 1 and $N$. The appropriate expressions for these signals are:

$$s_k = \sin\left[(\Omega-\omega')t + \frac{2\pi k}{N}\right] \quad (9)$$

$$s_{(N-k)} = \sin\left[(\Omega+\omega')t - \frac{2\pi k}{N}\right] \quad (10)$$

By operation on signals $s_k$ and $s_{(N-k)}$ in a manner to be explained in greater detail hereinbelow, the signal processor produces an output signal, $v_k$, which has the form $$v_k = GA_k \sin(\omega t + \beta_k) \quad (11)$$

where $G$ is constant determined by the required signal level, and $A_k$ and $\beta_k$ are given as:

$$A_k = \frac{1}{R^2}\left(1 + \frac{a}{R}(s_k + s_{N-k})\right) \quad (12)$$

$$\beta_k = \frac{\omega}{c}R\left(1 - \frac{a}{2R}(s_k + s_{N-k})\right) \quad (13)$$

The electrical signal, $v_k$, is then applied to the $k^{th}$ transducer, causing the latter to induce an acoustic wave in medium 10 whose amplitude is proportional to the amplitude of $v_k$ and whose phase is equal to the phase of $v_k$. Application of signal $v_k$, therefore, results in the generation of an acoustic wave whose phase and amplitude, as given by equations (12) and (13) respectively meet the requirements of equations (7) and (8) for that particular transducer.

With all the transducer electrically excited in the manner described, that is, with $v_1$ through $v_N$ simultaneously applied, the spiral raster depicted in FIG. 5 is generated.

As indicated hereinabove, the $k^{th}$ processing unit employed in the arrangement of FIG. 6 is required to generate a signal whose amplitude and phase are given by equations (12) and (13), respectively. FIG. 7 shows, in block diagram form, a processing unit 70 capable of satisfying these requirements. The unit comprises a first summing network 71 into which the two input sinusoidal signals $s_k$ and $s_{N-k}$ are introduced. Device 71 couples the sum signal produced therein to a signal divider 72 which develops two signals and conveys them along independent parallel paths into summing networks 73 and 74, respectively. Devices 73 and 74 are additionally energized by direct current signal sources 75 and 76, respectively. The output signals derived from devices 73 and 74 are coupled to amplifier 77 and 78, respectively. The amplified signal developed by amplifier 77 is then coupled to amplitude modulator 79 along with a signal derived from an oscillator 80. The output signals produced by amplifier 78 and modulator 79 are, in turn, coupled to phase modulator 81.

In operation, summing network 71, develops a sinusoidal output signal $s$, which is equal to the vector summation of the sinusoidal input signals, $s_k$ and $s_{N-k}$. The sum signal is coupled to signal divider 72, which typically can be a potentiometer, wherein two signals $(a/R)s$ and $(a/2R)s$ are produced. The signals are then transmitted into summing networks 73 and 74, respectively. In summing network 73 the signal $(a/R)s$ is summed vectorally with a direct current, unity amplitude signal provided by direct current source 75. In summing network 74 the signal $(a/2R)s$ is subtracted vectorally from a direct current unity amplitude signal provided by direct current source 76. The sum signal developed by device 73 is then coupled into amplifier 77 whose gain is equal to $G/R^2$. Similarly, the signal from device 74 is coupled to amplifier 78 whose gain is equal to $(\omega/c)R$. The output signals from devices 77 and 78 represent the amplitude and phase expressions given by equations (12) and (13), respectively. The required signal, therefore, will have an amplitude which varies in accordance with the output of amplifier 77 and a phase which varies in accordance with the output of amplifier 78. To obtain the required signal, the signal developed by device 77 is coupled to amplitude modulator 79 wherein it provides amplitude modulation of a sinusoidal signal of frequency $\omega$ coupled to the modulator from oscillator 80. The amplitude modulated output from modulator 79 is then coupled to phase modulator 81 where it is phase modulated by the signal derived from amplifier 78. The output signal developed by phase modulator 81, therefore, has an amplitude which varies in accordance with the signal developed by amplifier 77 and a phase which varies in accordance with the signal developed by amplifier 78 and, hence, is the required signal.

In order that the generated spiral raster of FIG. 5 be suitable for high definition display purposes, the spiral swirls are advantageously closely spaced. This requirement is met, as indicated earlier, by choosing the parameters $\omega'$ and $\Omega$ such that $\omega' >> \Omega$. The existence of this type of relationship is also beneficial in the design and fabrication of the amplifiers comprising rings 60 and 61 and the summing and amplifying devices in the processing units. This is easily seen by noting that these components operate at frequencies $(\omega'-\Omega$ and $\omega'+\Omega)$. By making $\omega' >> \Omega$, we need only design components that function at essentially the single frequency, $\omega'$. Hence, the circuitry required becomes fairly simple to implement.

A further point to note is that the peripheral transducers are required to operate at a substantially single acoustic frequency, $\omega$. Hence, evaporated transducers with very narrow bandwidths and high resonate peaks can be used.

In the foregoing discussion, the specific embodiment of an acousto-optical display which generates a spiral raster has been developed. A display generating this type of raster was singled out as an illustrative embodiment because it lends itself directly to the circular symmetry of the acousto-optical structure. Embodiments incorporating other types of rasters, however, can similarly be developed. The procedure to follow is the same as described in connection with the spiral raster. First, excitation equations are derived by substituting the equations defining the specific raster into equations (3) and (4). Secondly, electrical circuitry is developed to excite the boundary transducers so they provide acoustic excitations in accordance with the expressions derived. Finally, the excitations are applied to the appropriate transducers. Ideally, by following this procedure any type of raster can be generated. However, practical considerations, with regards to the complexity of the circuitry needed, will eventually place limitations on the types of rasters achievable.

The illustrations of FIG. 8A and 8B show the present acousto-optical display incorporated into visual display systems. In both embodiments, information contained in electrical signal $V_1$ is visually display on acousto-optical display 93 and viewed directly by viewer 94.

In the embodiment of FIG. 8A, the display is illuminated by a beam whose width is sufficient to cover the entire viewing area, and, therefore, movement of the beam is not required. As shown in FIG. 8A, a beam of light from light source 90 is directed into amplitude modulator 91 along the modulating signal $V_1$. The beam is amplitude modulated in accordance with the electrical signal, and directed into beam expander 92. The beam expander expands the beam to the required width, and conveys it onto the back surface of acousto-optical display 93. A visual image is then formed in accordance with the concepts heretofore presented. Typically, a suitable lens arrangement can be employed as the beam expander. The light source used can be any conventional high-powered collimated source such as a laser.

The optical modulating device can be any one of the many known in the art (see, for example, R. T. Denton, F. S. Chen and A. A. Ballman, "Lithium Tantalate Light Modulators," *Journal of Applied Physics*, Vol. 38 (Mar. 1967), pp. 1611–1617).

In applications where total illumination of the viewing area does not afford the required light intensity, the intensity can be increased by decreasing the width of the beam. In this latter case, a light deflector is employed to scan the beam over the viewing area. Such an arrangement is illustrated in FIG. 8B.

FIG. 8B differs from FIG. 8A only in that the beam expander of FIG. 8A has been replaced by optical beam deflector 95. The beam deflector deflects the modulated beam from modulator 91 onto areas of the display where the strained region forming the image is present. Since display resolution is dependent only upon the area of the strained region, as hereinabove explained, the width of the deflected beam, while small enough to provide the required light intensity can, nevertheless, be substantially larger than this area. Thus, at any one deflected position, the deflected beam will be incident upon the strained region throughout a considerable portion of the raster traversed by the region. As such, the beam need not be continuously deflected to follow the region, and a fairly simple digital deflecting device can be employed (see, for example, W. Kulcke et al., "Digital Light Deflectors," *Proceedings of the I.E.E.E.*, Vol. 54, No. 10, Oct. 1966, pp. 1419-1429).

FIG. 9 shows another embodiment of the present invention wherein the acousto-optical display is placed within an optical resonator in order to enhance the intensity of the scattered light perceived by the viewer. In this embodiment, which is shown in side view, an acousto-optical display 100 is placed within an optical resonator formed by mirrors 101, 102, 103 and 104. The four mirrors are positioned so that they reflect the light which has been reflected and refracted by the display. Mirror 101 is partially transmissive and allows the incident beam 105 to be coupled into the resonator. Mirrors 102, 103, and 104 are totally reflecting. Display 100, as described above, comprises an acousto-optical medium, a plurality of N transducers and the associated electrical circuits necessary to drive the transducers.

In accordance with this embodiment of the invention, the light interacting with the display is enhanced by the Q of the resonate cavity formed by the aforesaid mirrors. Hence, the scattered light provided by the display, shown as spherical wave 106 in the drawing, and reaching viewer 107 is correspondingly enhanced by the same factor. In this manner, the overall light level afforded by the display can be increased without a corresponding increase in the input optical power.

To avoid placing mirrors forward of the display, as is required by the embodiment of FIG. 9, a second optical resonator arrangement can be employed. This alternative embodiment is illustrated in FIG. 10.

In the embodiment of FIG. 10, the acousto-optical display unit 110 comprises an acousto-optical medium 10 and an optical medium 115 which are joined at interface 117. The display unit also includes a plurality of transducers which are attached to the periphery of medium 10 and associated electrically circuitry for driving these transducers. These elements have not been shown to avoid complicating the drawing. Optical medium 115 is chosen so that its index of refraction is greater than the index of refraction of acousto-optical medium 10. Embedded in medium 115, at predetermined angles, are reflecting mirrors 112 and 113. Partially transmissive mirror 111 and totally reflecting mirror 114 form the optical resonator.

In accordance with the invention, optical beam 116 is coupled through mirror 111 into medium 115 of the display. Mirror 112 redirects the beam and causes it to impinge upon interface 117 at an angle greater than the critical angle for the two media. The beam, except for the portion which is scattered by strained region 1, is totally reflected at the interface whereupon it is redirected by mirror 113 to mirror 114. Mirror 114 causes the beam to be reflected back over the same path traversed by the original beam.

As is shown in the drawing and indicated above, the strained region of the display is located within the resonator cavity and, as such, the light interacting with it will be enhanced by the Q of the resonator. The light scattered by the strained region, as indicated by spherical wave 118 in the drawing, will likewise be enhanced, and, as in the previous embodiment, a higher light level will be afforded viewer 119 without an increase in input optical power.

What is claimed is:

1. Apparatus comprising, in combination:
   a homogenous acousto-optical medium;
   an array of N electroacoustic transducers disposed about the periphery of said medium;
   means for selectively exciting said transducers such that substantial strain is produced over a single small region of said medium;
   and means for directing optical energy onto at least a portion of said medium, including said strained region causing a portion of said optical energy to be scattered.

2. Apparatus according to claim 1 in which said acousto-optical medium is disposed within a resonate cavity tuned to said optical energy.

3. Apparatus according to claim 2 in which said resonate cavity comprises four mirrors arranged to reflect the portions of said optical energy reflected and refracted by said acousto-optical medium.

4. Apparatus according to claim 2 in which said resonate cavity comprises:
   a transparent medium of higher index of refraction than said acousto-optical medium, located adjacent to and in contact with a surface of said acousto-optical medium;
   and a mirror arrangement for directing said optical energy onto said surface at an angle greater than the critical angle for said media.

5. A display device comprising:
   a homogenous acousto-optical medium having a disclike shape;
   an array of N electroacoustic transducers attached, at equal intervals of $2\pi/N$ radians, to the periphery of said medium;
   means for selectively applying electrical signals to said array of transducers;
   characterized in that said signals produce substantial strain over a single small region of said medium;
   and means for directing a beam of light onto a portion of said medium, including said strained region, said light beam interacting with said strained region to produce an observable image or display.

6. A display device according to claim 5 in which said means for directing a beam of light onto a portion of said medium comprises:
   a light source;
   and means, interposed between said light source and said medium, for deflecting said beam.

7. A display device according to claim 5 in which said strained region traverses said medium to form a raster.

8. A display device according to claim 7 in which said raster is a spiral.

9. A display device according to claim 8 in which the means for selectively applying electrical signals to said array of transducers comprises:
   first and second closed loops of N serially connected amplifiers, each having unity gain and producing a phase shift of $2\pi/N$ radians;
   means for driving the first of said loops at a frequency $(\omega' - \Omega)$, where $\omega'$ and $\Omega$ have predetermined values;
   means for driving the second of said loops at a frequency of $(\omega' + \Omega)$;
   a plurality of N identical signal processing units;
   means for applying the signal from the $k^{th}$ amplifier of said first loop to the $k^{th}$ processing unit, where $k$ is an integer from 1 to N;
   means for applying the signal from the $(N-k)^{th}$ amplifier of said second loop to the $k^{th}$ processing unit;
   said $k^{th}$ processing unit operating on said signals to develop a signal having a frequency $\omega$ whose amplitude $V_k$ and phase $\omega_k$ are given as $$V_k = \frac{G}{R^2}\left\{1 + \frac{a}{R}\left\{\sin\left[(\Omega-\omega')t + \frac{2\pi k}{N}\right]\right.\right.$$
$$\left.\left. + \sin\left[(\Omega+\omega')t - \frac{2\pi k}{N}\right]\right\}\right\}$$

$$\beta_k = \frac{\omega}{c}R\left\{1\frac{a}{2R}\left\{\sin\left[(\Omega-\omega')t + \frac{2\pi k}{N}\right]\right.\right.$$
$$\left.\left. + \sin\left[(\Omega+\omega')t - \frac{2\pi k}{N}\right]\right\}\right\}$$

where
  R is the magnitude of a vector from the center of the acousto-optical medium to its periphery,
  G and $a$ are predetermined constants, and
  c is the speed at which acoustic waves propagate within the acousto-optical medium.

* * * * *

UNITED STATES PATENT OFFICE
CERTIFICATE OF CORRECTION

Patent No. 3,637,292　　　　　　　　Dated January 25, 1972

Inventor(s) Harold Seidel

It is certified that error appears in the above-identified patent and that said Letters Patent are hereby corrected as shown below:

Column 6, line 33, change "resonate" to --resonant--.

Column 6, line 62, change "along the" to --along with--.

Column 8, line  6, change "homogenous" to --homogeneous--.

Column 8, line 16, change "resonate" to --resonant--.

Column 8, line 18, change "resonate" to --resonant--.

Column 8, line 22, change "resonate" to --resonant--.

Column 8, line 32, change "homogenous" to --homogeneous--.

Column 8, line 75, change "$\omega_k$" to --$\beta_k$--.

Signed and sealed this 5th day of September 1972.

(SEAL)
Attest:

EDWARD M. FLETCHER, JR.　　　　　　ROBERT GOTTSCHALK
Attesting Officer　　　　　　　　　Commissioner of Patents